No. 675,957. Patented June 11, 1901.
A. LEO.
LENS MOUNT FOR RIMLESS EYEGLASSES OR SPECTACLES.
(Application filed Jan. 26, 1901.)
(No Model.)

Witnesses:
J. F. Groat.
T. Maynard.

Ansel Leo. Inventor
By Marion & Marion
Attorneys

UNITED STATES PATENT OFFICE.

ANSEL LEO, OF MONTREAL, CANADA.

LENS-MOUNT FOR RIMLESS EYEGLASSES OR SPECTACLES.

SPECIFICATION forming part of Letters Patent No. 675,957, dated June 11, 1901.

Application filed January 26, 1901. Serial No. 44,826. (No model.)

*To all whom it may concern:*

Be it known that I, ANSEL LEO, a subject of His Majesty the King of Great Britain, residing in the city and district of Montreal, Province of Quebec, Canada, have invented certain new and useful Improvements in Lens-Mounts for Rimless Eyeglasses or Spectacles; and I do hereby declare that the following is a full, clear, and exact description of the invention, such as will enable others skilled in the art to which it appertains to make and use the same.

My invention is an improvement in rimless eyeglasses and spectacles, by which I secure a firm and secure connection between the lens and its mount without cutting, abrading, or otherwise treating the lens in any manner whatsoever.

It has long been recognized that drilling a hole in a lens is objectionable from many standpoints, so that numerous attempts have been made to unite the lens and the mount by clamps and other forms of devices. Among such prior attempts known to me there have been at least two in which it has been proposed to employ cement as a means for uniting the glass lens to the metallic mount; but owing to non-rigidity in the mount due to its faulty construction the use of cement has not been accompanied by any substantial results.

It is my purpose to provide a mount of improved construction which will afford the desired rigidity, stability, and strength, so as to enable an edge portion of the lens to be solidly and securely cemented thereto and at the same time to promote and cheapen the manufacture of the mount by making it possible to stamp the same from a single piece of sheet metal.

To the accomplishment of these ends the invention consists in the novel construction and arrangement of parts, as will be hereinafter fully described and claimed.

Figure 1:
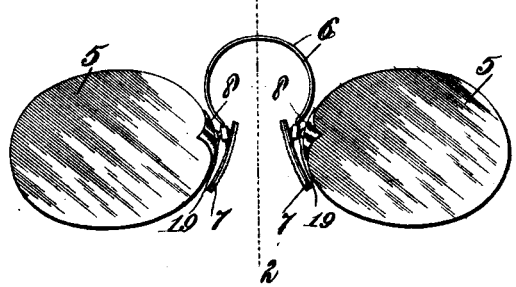
Figure 2:
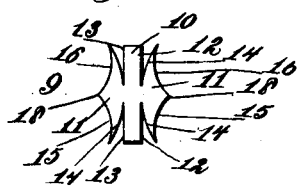
Figure 3:
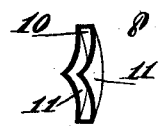

In the drawings hereto annexed, forming a part of this specification, Figure 1 is an elevation of a pair of eyeglasses having the lenses thereof united to their mounts as contemplated by this invention. Fig. 2 is detail view, on an enlarged scale, of one of the lens-mounts, illustrating the blank form thereof. Fig. 3 is a detail perspective view of one of the complete lens-mounts.

The same numerals of reference denote like parts in each of the several figures of the drawings.

5 designates the lenses, 6 the bridge-spring, 7 the nosepieces, and 8 the mountings, of a pair of eyeglasses, all of which except the mountings are of the usual or any preferred construction.

The important feature of my invention consists in the construction of the mount 8, the same being represented more clearly by Fig. 3 of the drawings. This mount is stamped or struck up in blank form from a single piece of sheet metal, as represented by Fig. 2 of the drawings, whereby the mount may be manufactured economically and rapidly. It is necessary in a lens-mount which contemplates dispensing with the ordinary clamping-screw for the lens and the employment of cement as a fastening medium to make said mount present a stable rigid form or construction and include large bearing-surfaces adapted for impingement against the edge and lateral faces of the lens without, however, offering material obstruction to the vision. These ends are attained in a mount of my construction, which mount is struck up in the form of a blank 9 from a single piece of metal. This blank consists of a plate 10 and the wings 11. Said plate has straight parallel edges 12 13, while the wings are curved substantially as shown. The inner edges 14 of each wing extend inwardly toward the straight edges of the plate, so as to join therewith and leave the tapered openings or incisions. The outer edges 15 16 of each wing extend from the curved edges 14 thereof toward each other and meet in the point 18.

In the manufacture of the mount it is stamped according to the blank 9, and the plate 10 is then given a longitudinal curvature, as represented by Fig. 3, thus making the plate conform to the edge of the lens. The wings 11 are bent so as to lie parallel to each other and in a plane at right angles to the plane of the curved plate 10, (see Fig. 3,) and the inner edges 14 of said wings are united to the straight edges of the longitudinally-curved edge bearing-plate 10—as, for example, by soldering or brazing. The complete mount presents the appearance substantially as represented by Fig. 3, from an inspection of which it is apparent that the wings serve to strengthen and reinforce the edge bearing-plate, and said wings also present large surfaces adapted to impinge against the lateral faces of the lens when said lens and the mount are assembled into operative relation. The lens and the mount are united solidly and firmly together by the employment of a quick-hardening form of cement, which is applied over the entire surface of the plate 10 and the wings 11, so as to constitute an inner coating for the mount and to adhere intimately to the lens and to the mount. The cement when freshly applied permits the lens to be adjusted edgewise within the mount before the same becomes hard and set, thus enabling the optician to accurately adjust the lens in order to secure the proper fitting of the eyeglasses in accordance with an oculist's prescription.

The solidity and rigidity of the mount, in connection with the large surfaces afforded by the peculiar shape of the wings, enable me to successfully unite a lens to the mount by the aid of cement, thus attaining a result in this particular art which, to my knowledge, has not heretofore been successfully accomplished. While the wings of the mount afford relatively large bearing-surfaces for engagement with the lens, it is to be understood that the mount does not obstruct the vision in any way. As a matter of fact, the mount is not visible to the wearer of the eyeglasses when the parts are properly assembled.

To provide for the attachment of the spring and nosepieces, a pillar or post 19 is united to the outer face of the edge bearing-plate 10, forming a part of the mount—as, for example, by soldering the post to the mount. The post has a socket adapted to receive the spring 6 and a part of one nosepiece 7, which parts are held in place by the screw 20. The mount and the post may be finished in any suitable style.

Although I have shown and described my improvement in connection with eyeglasses and as specially adapted for use in connection with the nosepiece and the spring, I would have it understood that the principle of the mount may be used in connection with the ring-handle which is sometimes applied to eyeglasses and also in the construction of spectacles.

Having thus described my invention, what I claim as new is—

A lens-mount blank stamped in a single piece of sheet metal and comprising a central elongated plate provided with straight parallel side edges, and the wings disposed on opposite sides of the plate and joined to the middle portions thereof, each wing having a convexly-curved inner edge which extends outwardly from the line of juncture between said plate and the wings, whereby the plate may be bent to a longitudinally-curved contour and said curved edges of the wings may be soldered to the plate, substantially as described.

In witness whereof I have hereunto set my hand in the presence of two witnesses.

ANSEL LEO.

Witnesses:
  H. T. BERNHARD,
  T. MYNARD.